(12) United States Patent
Fallis, III et al.

(10) Patent No.: US 7,900,991 B2
(45) Date of Patent: Mar. 8, 2011

(54) VEHICLE ROOF ARCHITECTURE FOR REMOVABLE SOFT TOP OR HARDTOP COVER

(75) Inventors: Robert E. Fallis, III, Rochester, MI (US); Michael T. Willard, Harrison Township, MI (US); Robert D. Wiechowski, Warren, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 85 days.

(21) Appl. No.: 12/375,092

(22) PCT Filed: Jul. 26, 2007

(86) PCT No.: PCT/US2007/074413
§ 371 (c)(1),
(2), (4) Date: Jan. 26, 2009

(87) PCT Pub. No.: WO2008/014372
PCT Pub. Date: Jan. 31, 2008

(65) Prior Publication Data
US 2010/0007179 A1      Jan. 14, 2010

Related U.S. Application Data

(60) Provisional application No. 60/833,593, filed on Jul. 27, 2006.

(51) Int. Cl.
*B60J 7/11* (2006.01)
(52) U.S. Cl. .......... 296/107.01; 296/109; 296/219; 296/218; 296/107.13

(58) Field of Classification Search .......... 296/109, 296/107.08, 216.01, 219, 218, 107.01, 107.09, 296/107.13, 107.15
See application file for complete search history.

(56) References Cited

U.S. PATENT DOCUMENTS

| | | | | |
|---|---|---|---|---|
| 4,821,394 | A * | 4/1989 | Martinez-Vera | 29/401.1 |
| 5,725,273 | A * | 3/1998 | Vernon et al. | 296/218 |
| 5,738,405 | A * | 4/1998 | Richters et al. | 296/193.03 |
| 5,979,969 | A | 11/1999 | Hilliard et al. | |
| 5,992,917 | A | 11/1999 | Hilliard et al. | |
| 6,053,560 | A | 4/2000 | Rothe | |
| 6,386,617 | B1 | 5/2002 | Kusuma et al. | |
| 6,893,515 | B2 * | 5/2005 | Guan et al. | 148/557 |
| 7,063,371 | B2 | 6/2006 | Willard | |
| 2002/0079719 | A1 | 6/2002 | Crijns et al. | |
| 2005/0001446 | A1 | 1/2005 | Morley | |
| 2005/0116511 | A1 | 6/2005 | Leroy et al. | |
| 2005/0134096 | A1 | 6/2005 | Fallis, III et al. | |
| 2007/0257521 | A1 * | 11/2007 | Fallis et al. | 296/218 |
| 2010/0045075 | A1 * | 2/2010 | Mack et al. | 296/215 |

FOREIGN PATENT DOCUMENTS

| | | |
|---|---|---|
| GB | 1396482 | 6/1975 |
| GB | 1444709 | 8/1976 |

* cited by examiner

*Primary Examiner* — Jason S Morrow
(74) *Attorney, Agent, or Firm* — Brooks Kushman P.C.

(57) ABSTRACT

A roof system for a vehicle that has a roof support structure to which a hardtop roof (34) or a retractable soft top roof (62) may be latched. The roof support structure includes a transverse reel that extends transversely relative to the vehicle direction and is connected to a panel that is also connected to the rear rail. The hardtop includes a rigid panel and a frame. The soft top is supported on attached bows with which the soft top is stored in a cassette after removal.

13 Claims, 7 Drawing Sheets

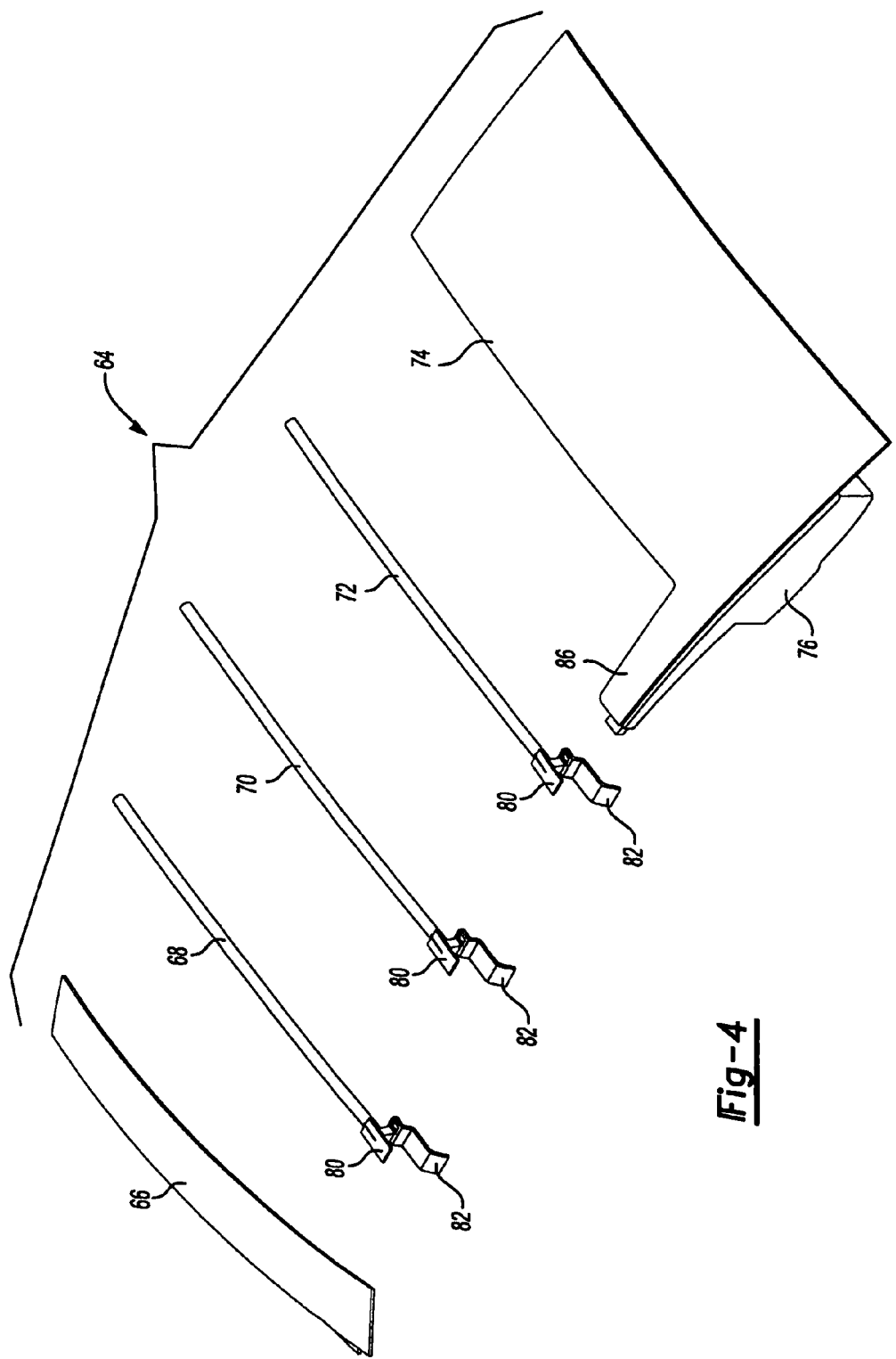

US 7,900,991 B2

VEHICLE ROOF ARCHITECTURE FOR REMOVABLE SOFT TOP OR HARDTOP COVER

CROSS-REFERENCE TO RELATED APPLICATIONS

This application claims the benefit of U.S. provisional application Ser. No. 60/833,593 filed Jul. 27, 2006.

BACKGROUND OF THE INVENTION

1. Field of the Invention

The present invention relates to a vehicle that is provided with a removable soft top or a hardtop that utilizes the same roof architecture for securing either the soft top or the hardtop to the other parts of the roof structure.

2. Background Art

Vehicles are generally designed to be either hardtop vehicles or convertible vehicles. Most convertible vehicles are either of the soft top or retractable hardtop variety. In the past, some vehicles were initially manufactured as hardtop vehicles, but were converted to a convertible vehicle design by cutting off the roof, reinforcing the body and installing a convertible top in place of the hardtop. While this approach is suitable for low volume production, this process of providing a convertible top vehicle is not economical.

Manufacturers have a need to provide customers with hardtop vehicles or soft top vehicles while meeting manufacturing cost targets. There is also a need for a vehicle roof architecture that eliminates the need to provide reinforcements for stiffening the body when a soft top is installed on a vehicle.

There is a further need for a vehicle that can be used by a consumer as either a hardtop vehicle or as a soft top vehicle. It would be advantageous to provide a vehicle design that provides both a hardtop roof that may be removed from the vehicle and replaced with a soft top roof. The soft top roof can be converted from a covering soft top orientation to a stored condition with the roof being open above the passenger compartment.

These and other problems and needs are addressed by Applicant's invention as summarized below.

SUMMARY OF THE INVENTION

According to one aspect of the present invention, a vehicle roof architecture is provided that can be fitted with a hardtop roof or a soft top roof. The hardtop and soft top roof for the vehicle each have complimentary structural features that are received by the roof architecture comprising a windshield header, right and left side rails with a transverse rail and a rear rail that form a reinforcement between the two side rails. A receptacle is disposed between the right and left side rails and the transverse and rear rails generally behind the passenger compartment of the vehicle.

According to another aspect of the present invention, a hardtop is provided that includes a reinforcing frame. The reinforcing frame includes latching features that secure the hardtop in place on the roof architecture. The roof support frame includes latching features that secures either roof to the roof architecture. When the hardtop is latched in place on the roof architecture, seals are compressed to provide a tight, waterproof seal between the hardtop and the roof architecture. The hardtop may include a transparent, or translucent, covering panel that permits light to pass into the vehicle passenger compartment. The covering panel may be formed of glass or polycarbonate. Alternatively, the covering panel may be painted or formed of sheet metal to provide an opaque hardtop roof. The reinforcing frame may be a stamped part, composite or may be a cast or thixomolded member formed of an aluminum or magnesium alloy.

According to another aspect of the invention, the soft top includes a plurality of bows that extend transversely between the right and left side rails of the roof architecture. The bows have bow ends that are received in bow end receptacles that are fixed at spaced locations along the length of the roof opening. A removable cassette is provided for storing the soft top, including the transversely extending bows, in a cassette that is located above and behind the passenger compartment. The cassette is received between transverse bars that define an opening. The bow and receptacles are slidably secured to the right and left roof rail. The bows are secured to the fabric of the soft top cover at spaced intervals when the soft top is extended across the opening in the roof architecture. The soft top may be completely detached from the roof architecture by releasing the bow ends from the bow end receptacles and rolling or wrapping the soft top cover with the bows before placing it in the storage cassette. The storage cassette preferably includes a cover panel that may be secured when the soft top is placed or stored in the storage cassette.

According to yet another aspect of the invention, the transverse rail and the rear rail reinforce the roof architecture. The vehicle roof stamping assembly provides a dimensionally stable roof structure to which either the hard top or soft top may be detachably secured.

These and other features and aspects of the present invention will be better understood in view of the attached drawings and following detailed description of the illustrated embodiments.

BRIEF DESCRIPTION OF THE DRAWINGS

FIG. 4 is an exploded perspective view of a header panel, removable bows and a storage well of the removable soft top;

DETAILED DESCRIPTION OF THE PREFERRED EMBODIMENT(S)

Figure 1:
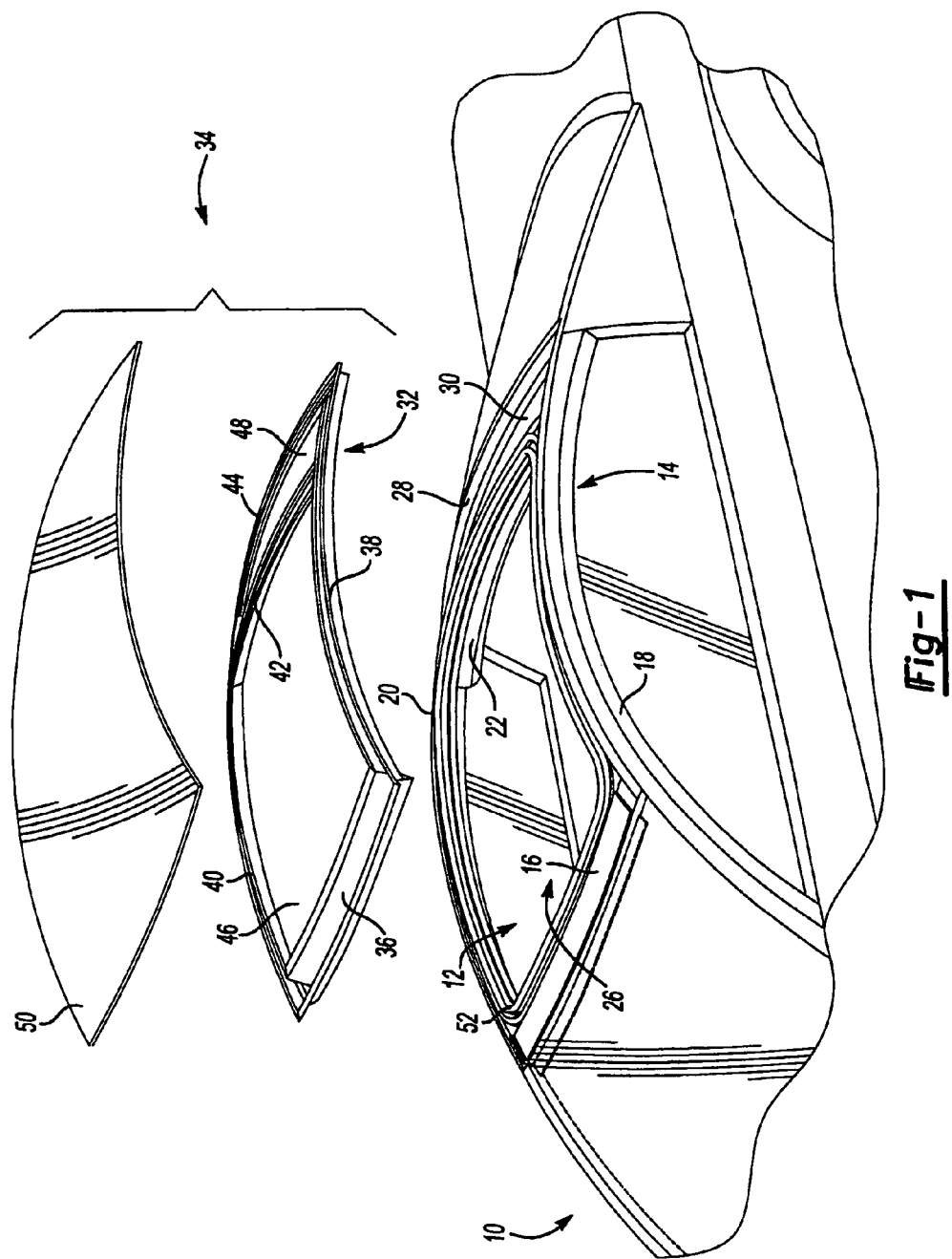
FIG. 1 is a fragmentary perspective view of a vehicle having a removable hardtop supported by the roof architecture.

Referring to FIG. 1, a portion of a vehicle 10 is shown that encloses a passenger compartment 12. The passenger compartment 12 is defined, in part, by a roof support structure that is generally indicated by reference numeral 14. The roof support structure 14 includes a windshield header 16, a left roof rail 18, a right roof rail 20 and a transverse beam 22. The left and right roof rails 18, 20 extend between the transverse beam 22 and the windshield header 16 on opposite sides of the vehicle 10.

A roof opening 26 is defined by the roof support structure 14 between the left and right roof rails 18, 20, windshield header 16 and the transverse beam 22. A rear beam 28 is provided at a spaced location behind the transverse beam 22. The transverse beam and rear beam reinforce the roof architecture between the left and right side rails 18, 20. A well 30 is defined between the transverse beam 22 and the rear beam 28.

A roof frame 32 is provided as part of a hardtop roof assembly 34. The roof frame 32 includes a header reinforcement 36 from which left side rail 38 and right side rail 40 extend rearwardly to a transverse rail 42. The header reinforcement 36 is attached to the windshield header 16 when the hard top roof assembly is attached to the vehicle 10. Left and right side rails 38 and 40 are received on left and right roof rails 18, 20. The transverse rail 42 is assembled over the transverse beam 22. A rear rail 44 is provided rearward of the transverse rail 42 and is assembled to the vehicle over the rear beam 28. A frame opening 46 is defined between the header reinforcement 36 and transverse rail 42 and between the left side rail 38 and right side rail 40. A gap 48 is provided between the transverse rail 42 and rear rail 44. A cover panel 50 also forms part of the hardtop roof assembly 34. The cover panel 50 may be a glass panel or a polycarbonate panel if it is desirable to provide a transparent roof over the passenger compartment 12. If a transparent cover panel 50 is provided the inner surface of the panel may be painted to conceal portions of the roof frame 32 or other portions of the roof support structure 14. Alternatively, the cover panel 50 could be formed of steel, aluminum or other opaque material if it is not desired to provide a transparent roof panel.

A main seal 52 extends around the roof opening 26. The main seal 52 provides a weather-tight seal between the hardtop roof assembly 34 and the roof support structure 14.

Figure 2:
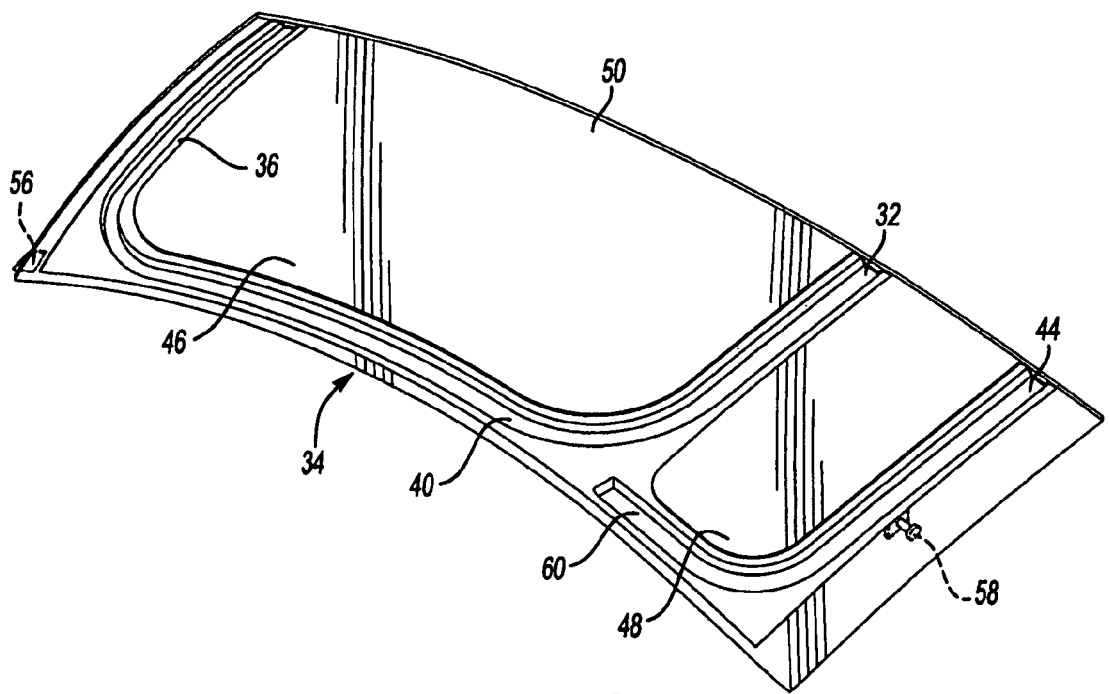
FIG. 2 is a fragmentary inside perspective view of the removable hardtop.

Referring to FIG. 2, the hardtop roof assembly 34 is shown from the inside. The hardtop roof assembly 34 includes the roof frame 32. The roof frame 32, as previously described, includes the header reinforcement 36, right side rail 40, transverse rail 42 and rear rail 44. The cover panel 50 extends across the frame opening 46 and across the gap 48 between the transverse rail 42 and the rear rail 44.

A front corner latching feature 56 is partially shown that is secured to the cover panel 50 near the corner defined by the header reinforcement 36 and right side rail 40. A portion of a rear edge latch 58 is shown secured to the cover panel 50 adjacent the rear rail 44. A rear rail extension 60 is shown that extends from the lateral ends of the rear rail 44 in the forward direction towards the transverse rail 42.

Figure 3:
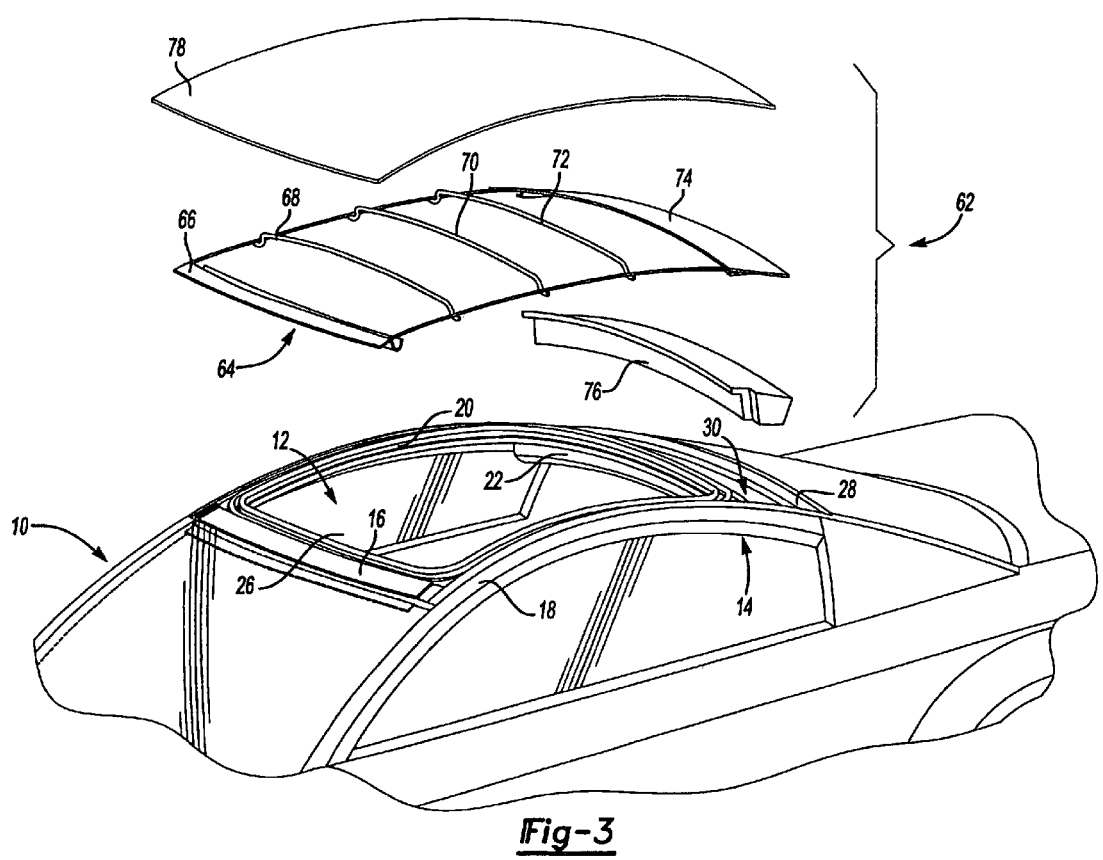
FIG. 3 is a fragmentary exploded perspective view of a removable soft top.

Referring to FIG. 3, a soft top cover assembly 62 is shown in conjunction with the vehicle 10. The soft top cover assembly 62 is shown in an exploded perspective in FIG. 3 with the cover assembly 62 being generally located above its installation position on the vehicle 10. The vehicle 10 defines the roof support structure 14 that is formed by the windshield header 16, left roof rail 18, right roof rail 20 and transverse beam 22 that together define the roof opening 26. A cover support assembly is generally indicated by reference numeral 64. The cover support assembly includes a header bar 66, or one bow, a two bow 68, a three bow 70 and a four bow 72. The rear portion of the cover support assembly 64 is a rear cover panel 74. Rear cover panel 74 covers the removable cassette assembly 76. A flexible fabric cover panel 78 is secured to the cover support assembly 64. The cover support assembly 64 supports the fabric cover panel 78 which spans the roof opening 26 and also tensions the flexible fabric cover.

Referring to FIG. 4, the cover support assembly 64 is shown with the fabric cover panel 78 removed. The cover support assembly 64 is shown to include the header bar 66, two, three and four bows 68, 70, 72 and the rear cover panel 74. The two, three and four bows 68, 70, 72 have bow end fittings 80 that are received in bow end receptacles 82. The bow end receptacles 82 are fixed to the roof rails 18 and 20 at spaced locations. To install the fabric cover panel 78, the bow end fittings 80 are secured to the bow end receptacles 82 as will be more specifically described with reference to FIGS. 5A and 5B, below. A forward extension 86 extends in front of the rear cover panel 74 on both sides thereof.

Figure 5A:
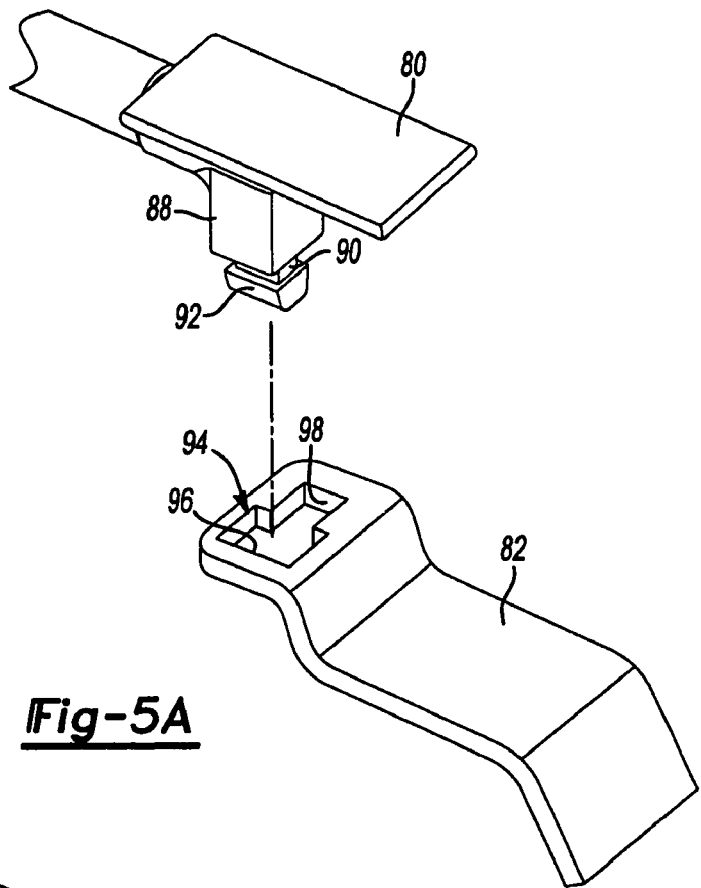
FIGS. 5A and 5B are fragmentary perspective views of bow ends and bow end receptacles shown in two stages of assembly.
Figure 5B:
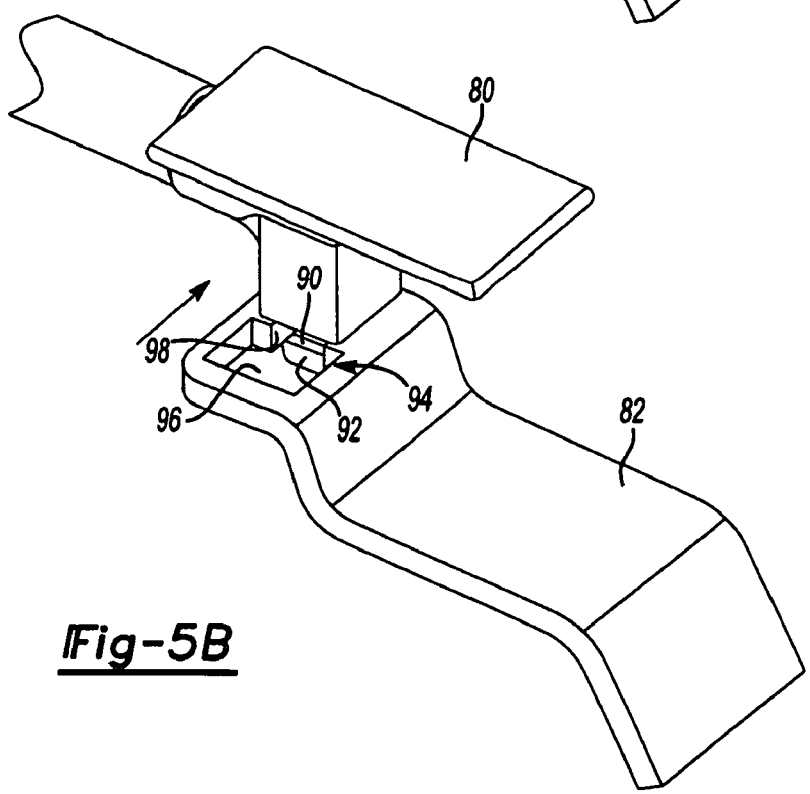

Referring to FIGS. 5A and 5B, the bow end fittings 80 have downwardly extending anchors 88 that are provided with a T-shaped end 90 that terminates in a tapered nose 92. The tapered nose 92 aids in locating the bow end fittings 80 relative to the bow end receptacles 82. The T-shaped end 90 may be received in a T-slot 94 formed in the bow end receptacles 82. The T-slot 94 includes an insertion area 96 that is broader than a retention area 98. The anchors 88 are assembled to the bow end receptacles 82 by inserting the T-shaped end 90 into the T-slot 94. To install the roof bow end fittings 80 on the end receptacles 82, the anchor 88 is inserted in the insertion area 96 and then shifted longitudinally into the retention area 98. To remove the bow end fittings 80 from the bow end receptacles 82, the T-shaped end 90 of the anchor 88 is moved from the retention area 98 to the insertion area 96. At this point, the bow end fittings 80 may be removed from the bow end receptacles 82. Removal of the soft top cover assembly 62 will be described with reference to FIG. 6.

Figure 6:
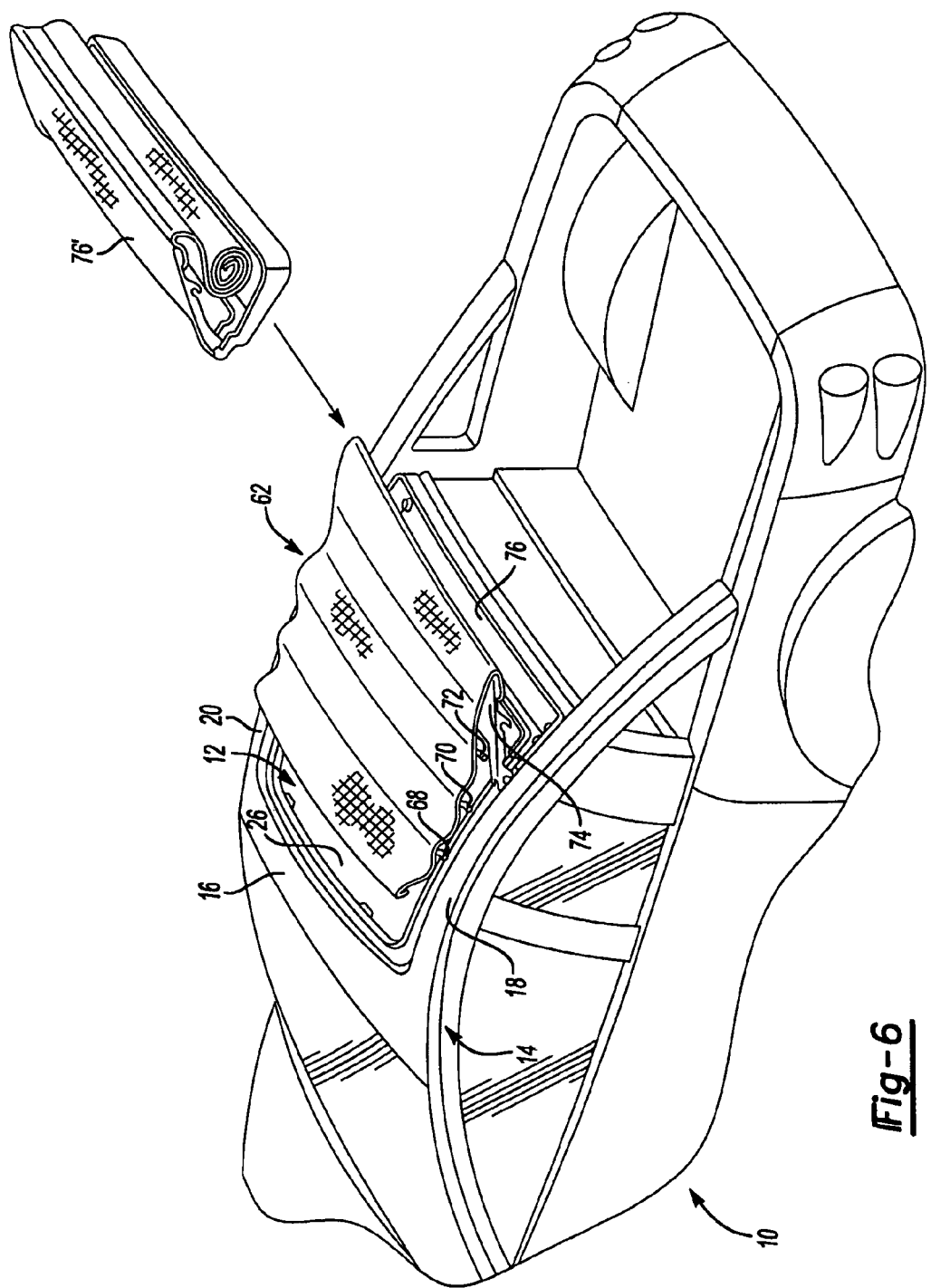
FIG. 6 is a fragmentary perspective view of a vehicle with the removable soft top supported by the roof architecture and also showing the cassette removed from the vehicle with the soft top cover and soft top support assembly stored inside the cassette.

As shown in FIG. 6, the vehicle 10 is shown as the soft top cover assembly 62 is being removed to open the roof area over the passenger compartment 12. The soft top cover assembly 62 is supported by the windshield header 16, the left roof rail 18, the right roof rail 20 and the transverse beam 22. As shown in FIG. 6, the header reinforcement 36 has been separated from the windshield header 16. The rear cover panel 74 is lifted from the removable cassette assembly 76 to release the tension on the soft top cover assembly 62. By releasing the tension on the cover assembly 62 also facilitates detaching the other bows 68-72 from the right and left side rails 38, 40. The fabric cover panel 78, the header reinforcement 36, and the bows 68-72 are rolled up to be stored inside the removable cassette assembly 76.

The removable cassette assembly 76' is also shown in FIG. 6 after it has been removed from the vehicle. The fabric cover panel 78, header bar 66, two, three and four bows 68-72 are all stored within the removable cassette assembly 76' When stored, the cover panel 78 is closed over the other parts of the soft top assembly 62.

Figure 7:
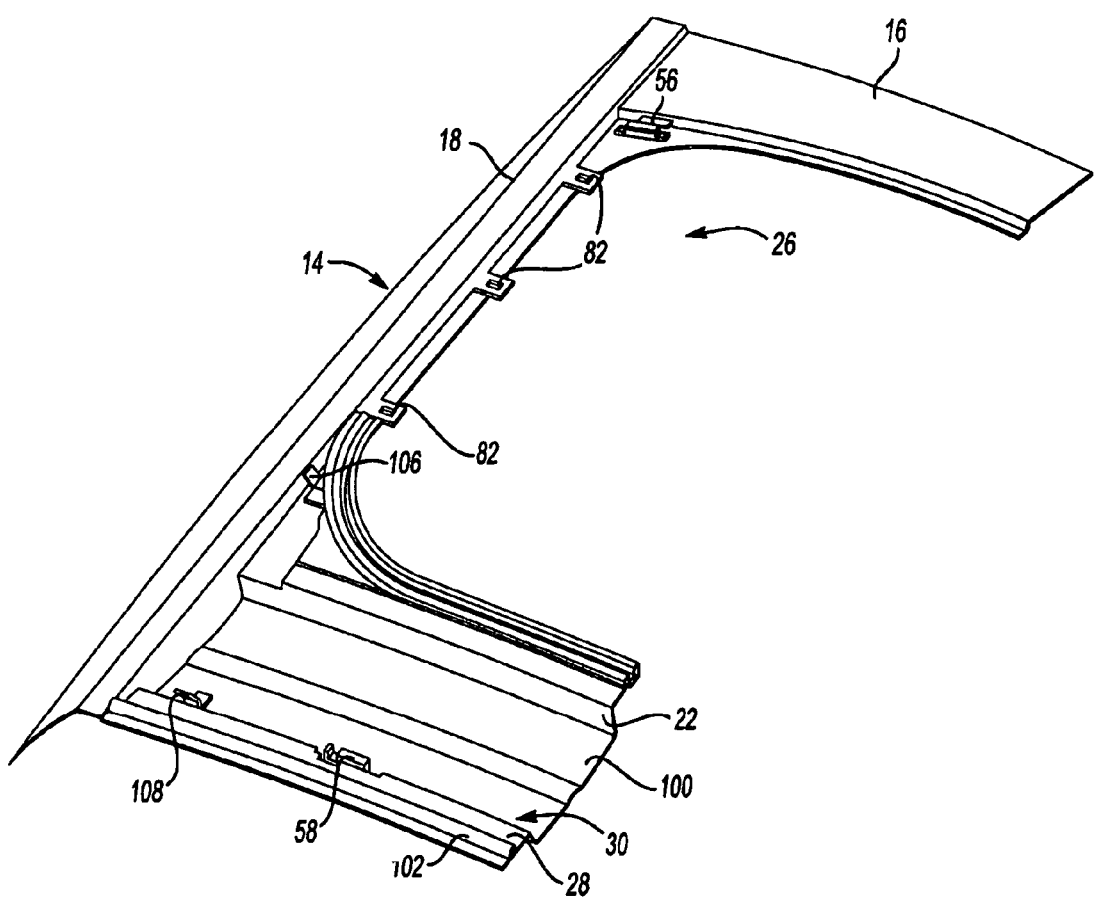
FIG. 7 is a fragmentary perspective view of the vehicle roof support architecture with neither roof assembly installed.

Referring to FIG. 7, the roof support structure 14 is partially shown to illustrate the connection points for connecting either the hard top roof assembly 34 or the soft top roof assembly 62 to the same roof support structure 14. The windshield header 16, left roof rail 18, and transverse beam 22 are shown as they partially surround the roof opening 26. A portion of the front corner latch 56 is shown near the juncture of the windshield header 16 and left roof rail 18. A portion of a rear edge latch 58 is shown assembled to the rear beam 28. The front corner latch 56 and rear edge latch 58 are used to secure either the hardtop roof assembly 34 or the soft top cover assembly 62 to the roof support structure 14.

Bow end receptacles 82 are shown secured to the left roof rail 18 at spaced locations. The bow end receptacles 82, as shown, are fixed members, but it should be understood that the bow end receptacles 82 could also be mounted on a track that would allow the bow end receptacles 82 to be positioned at desired locations along roof rail 18.

A floor 100 of the well 30 is visible in FIG. 7 with the removable cassette assembly 76 removed. Also visible in FIG. 7 is a rear edge seal 102 that provides a seal between the rear cover panel 74 and the rear beam 28. Additional fasteners, such as a cassette bracket clip 106 and a rear spring clip 108, may be provided, as needed, to secure either the hardtop roof assembly 34 or the soft top cover assembly 62 to the roof support structure 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A roof system for a vehicle having interchangeable roof assemblies comprising:
    a roof support structure defining a roof opening between a header, right and left side roof rails, and a transverse rail, the roof support structure also having a panel secured to the transverse rail and to a rear rail;
    a removable hardtop roof assembly, the hardtop roof assembly including a rigid roof panel and a roof frame that are assembled together and attached to the roof support structure with the roof panel spanning from the header to the rear rail, wherein the roof frame has a header engaging portion, a right and left side roof rail engaging portion, a transverse rail engaging portion, and a rear rail engaging portion;
    a removable soft top roof assembly, the soft top roof assembly including a fabric cover panel, a plurality of bows extending in a transverse vehicle direction between the right and left side roof rails and supporting the cover panel to cover the roof opening, a cassette assembly disposed between the transverse rail and the rear rail on the panel of the roof support structure; and
    latches for securing one of the hardtop roof assembly and the soft top roof assembly to the roof support structure.

2. The roof system of claim 1 wherein the cassette assembly is removably assembled to the panel that is secured to the transverse rail and the rear rail.

3. The roof system of claim 2 wherein the fabric cover panel is retracted into the cassette to store the fabric cover panel above the panel that is secured to the transverse rail and to a rear rail, and thereby uncovering a primary frame opening between the header, right and left side roof rails, and the transverse rail.

4. The roof system of claim 3 wherein the bows are attached to the fabric cover panel and are moved and stored with the fabric cover panel.

5. The roof system of claim 1 further comprising a plurality of bow end fittings, wherein one bow end fitting is provided between each bow and each one of the right and left side roof rails, and wherein each bow end fitting is received in a bow end receptacle that is provided on one of the right and left side roof rails.

6. The roof system of claim 5 wherein the bow end fittings each include a T-shaped end and the bow receptacle each include a T-shaped slot that receives the T-shaped end of one of the bow end fittings.

7. The roof system of claim 1 further comprising a seal wherein the header engaging portion, the right and left side roof rail engaging portions, and the transverse rail engaging portion each engage the seal when the hardtop roof assembly is secured to the roof support structure.

8. A roof for a vehicle comprising:
    a roof support structure defining a roof opening between a header, right and left side rails, and a transverse rail, the roof support structure also having a panel secured to the transverse rail and to a rear rail;
    a removable soft top roof, the soft top roof including a fabric cover panel, a plurality of bows extending in a transverse vehicle direction between the right and left side rails and supporting the cover panel to cover the roof opening, a cassette assembly disposed between the transverse rail and the rear rail on the panel of the roof support structure; and
    latches for securing the soft top roof to the roof support structure.

9. The roof of claim 8 wherein the cassette assembly is removably assembled to the panel that is secured to the transverse rail and the rear rail.

10. The roof of claim 9 wherein the fabric cover panel is retracted into the cassette to store the fabric cover panel above the panel that is secured to the transverse rail and to a rear rail, and thereby uncovering a primary frame opening between the header, right and left side roof rails, and the transverse rail.

11. The roof of claim 10 wherein the bows are attached to the fabric cover panel and are moved and stored with the fabric cover panel.

12. The roof of claim 8 further comprising a plurality of bow end fittings, wherein one bow end fitting is provided between each bow and each one of the right and left side roof rails, and wherein each bow end fitting is received in a bow end receptacle that is provided on one of the right and left side roof rails.

13. The roof of claim 12 wherein the bow end fittings each include a T-shaped end and the bow receptacle each include a T-shaped slot that receives the T-shaped end of one of the bow end fittings.

* * * * *